Jan. 2, 1923.

H. B. JONES.
VENTILATED STAVE.
ORIGINAL FILED SEPT. 20, 1921.

Re. 15,516

INVENTOR
Harry B. Jones,
By Barrett & Truman, Attys

Reissued Jan. 2. 1923.

Re. 15,516

UNITED STATES PATENT OFFICE.

HARRY B. JONES, OF CHICAGO, ILLINOIS, ASSIGNOR, BY MESNE ASSIGNMENTS, TO PERMANENT PRODUCTS COMPANY, OF CHICAGO, ILLINOIS, A CORPORATION OF ILLINOIS.

VENTILATED STAVE.

Original No. 1,390,994, dated September 20, 1921, Serial No. 406,955, filed August 26, 1920. Application for reissue filed October 23, 1922. Serial No. 596,811.

*To all whom it may concern:*

Be it known that I, HARRY B. JONES, a citizen of the United States, residing in Chicago, in the county of Cook and State of Illinois, have invented a certain new and useful Improvement in Ventilated Staves, of which the following is a specification.

My invention relates to that class of staves which are employed in the construction of granaries or other buildings, which are erected in sections.

There is a very considerable demand for buildings of concrete construction suitable for the storage of material other than ensilage, which contents require ventilation, as for example, corn on the cob.

My invention has for its objects to provide a ventilated stave suitable for use in constructing storage buildings of the above character, which will permit a free circulation of air through the walls of the building, but which is so constructed as to exclude rain, snow, and the like, and has for its further object to provide a stave which may be so constructed as to exclude vermin, such as rats, without interfering with a sufficiently free ventilation.

My means of accomplishing the foregoing objects may be more readily understood by having reference to the accompanying drawing, which is hereto annexed, and is a part of this specification, and in which—

Similar reference numerals refer to similar parts throughout the entire description.

Figure 1:
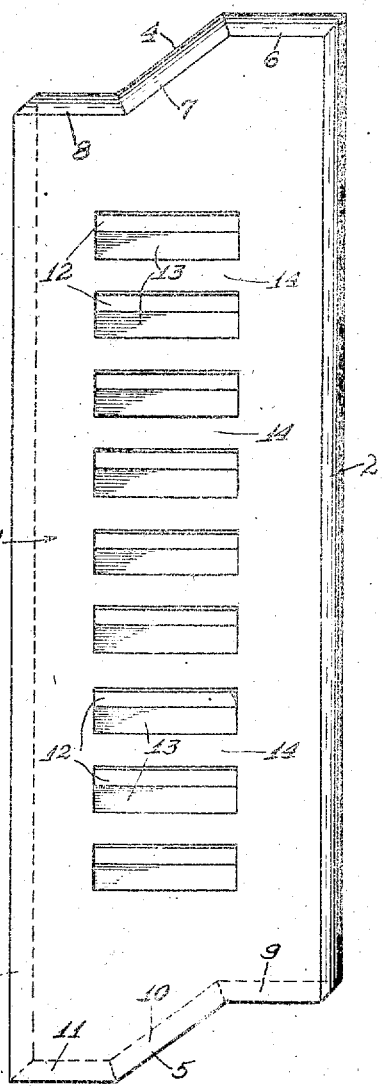
Fig. 1 is a side elevation of a stave constructed in accordance with my improvement.
Figure 2:
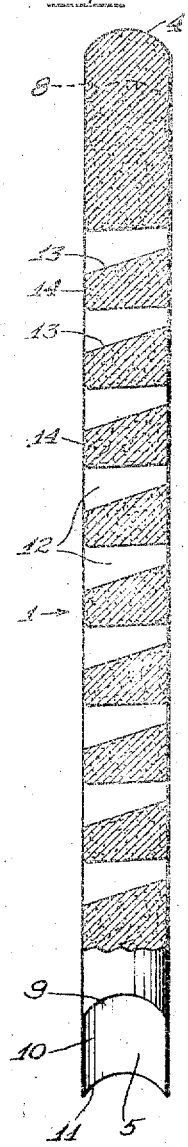
Fig. 2 is a vertical sectional view.

As shown in the drawing, the stave 1 is provided at one side with a convex rib 2, and at the other side with a concavity 3, which is fitted to and coincides with the convex rib of the next adjacent or mating stave.

The convex rib extends along one of the vertical edges of the stave, and over the upper end 4 thereof, and the concavity along the other vertical edge and across the lower end 5, as clearly shown in the detail views. The end 4 is formed with a horizontal portion 6 and an inclined portion 7, and a horizontal portion 8 at the bottom of the inclined portion 7. A similar construction is employed at the end 5, there being a horizontal concaved portion 9 and 11 extending from the ends of an intermediate inclined portion 10.

Figure 4:
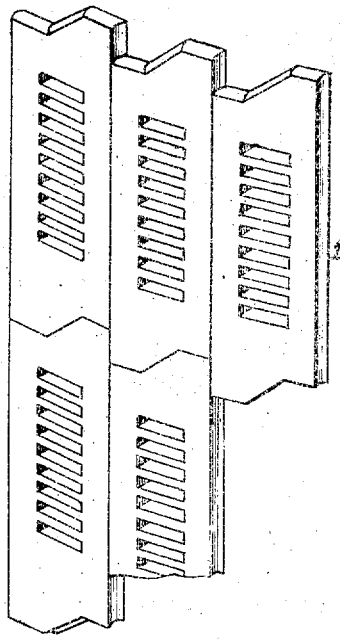
Fig. 4 is a fragmentary section of the wall constructed with my improved stave.
Figure 3:
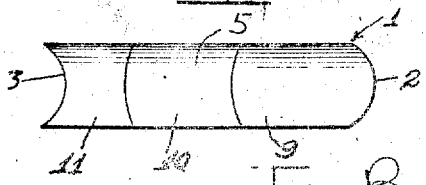
Fig. 3 is an end view.

There being no flat surface upon which the water may lodge, the result of this construction is that the concaved end 4 sheds water from rain or snow, thus preventing the water from leaking inside of the building. It will be apparent from an examination of Fig. 4 that by constructing the two horizontal portions on the ends upon different planes and connecting them by an inclined portion, the joint is broken with the next adjacent stave.

In the center of the stave I form a plurality of ribs 14, defining the upper and lower walls of openings 12 intermediate the ribs, which openings provide for the circulation of air. The upper wall 13 of the rib 14 is slanted so that water cannot pass into the interior of the silo unless it comes in a horizontal direction. By tapering the ventilating openings inwardly from the outer surface of the staves, the ventilating passages may be narrowed that rats and other vermin cannot pass through the staves, although the outer openings would be large enough to admit them.

It will be obvious to persons skilled in the art, from the foregoing description, taken in connection with the drawings, that a stave constructed in this manner provides for ample ventilation, and at the same time provides for shedding of water resulting from rain or snow, and excludes the entrance of small animals.

Having described my invention, what I regard as new and desire to secure by Letters Patent is:

1. A ventilated stave consisting of a unitary slab provided with a plurality of substantially transverse slots constricted in their cross-sectional area inwardly from one face of the stave.

2. A ventilated stave comprising a plurality of spaced ribs formed integrally therewith, the upper face of each rib comprising a portion in elevated position with respect to the outer edge portion thereof, so as to divert water toward the outer face of the stave.

3. A ventilated stave comprising a slab having a plurality of ribs, there being openings through the stave intermediate said ribs, the upper wall of each rib being slanted downwardly and outwardly so as to shed rain and the like.

4. A ventilated stave comprising a plurality of spaced ribs formed integrally therewith and providing between them a series of ventilating openings, the upper face of each rib comprising a portion in elevated position with respect to the outer edge portion thereof, and the lower face of each rib comprising a portion in depressed position with respect to the inner edge portion thereof, the elevated portion of the upper face of one rib and the depressed portion of the lower face of the next higher rib being in spaced relation between the inner and outer faces of the stave with the elevated portion of the upper face closer to the inner face of the stave.

5. A ventilated stave of molded concrete comprising a plurality of spaced ribs formed integrally therewith and providing between them a series of ventilating openings constricted in cross-sectional area inwardly from one face of the stave, the upper face of each rib comprising a portion in elevated position with respect to the outer edge portion thereof so as to divert water toward the outer face of the stave.

In witness whereof I have signed the foregoing specification.

HARRY B. JONES.